Oct. 25, 1932.     A. DINA     1,884,609
RESILIENT FILM GUIDE FOR MOTION PICTURE PROJECTION MACHINES
Filed Jan. 23, 1930
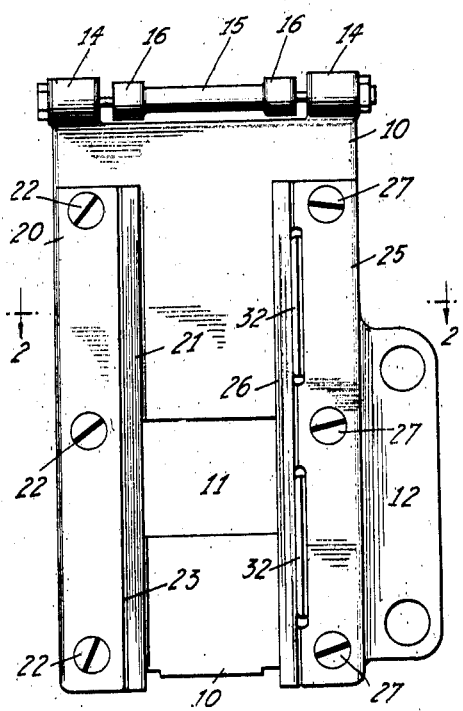
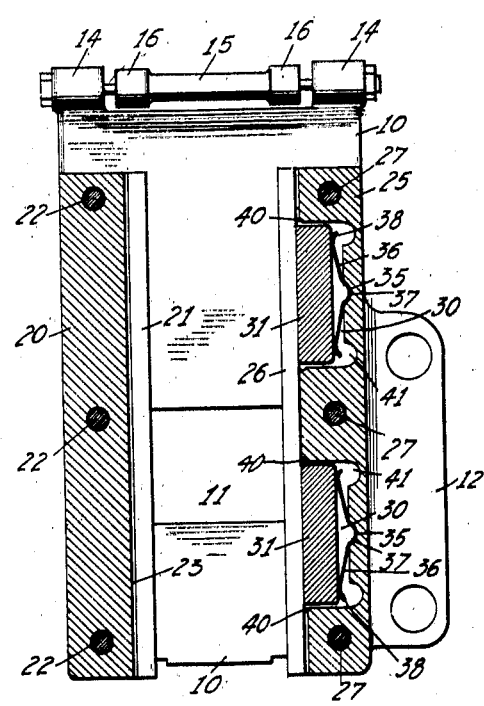
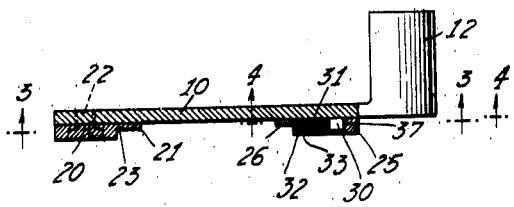
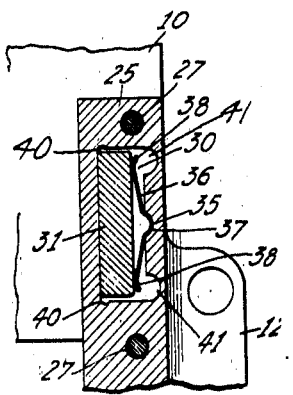
INVENTOR
Augusto Dina
BY
Howard W. Dix
ATTORNEY Patented Oct. 25, 1932

1,884,609

UNITED STATES PATENT OFFICE

AUGUSTO DINA, OF ELIZABETH, NEW JERSEY, ASSIGNOR TO INTERNATIONAL PROJECTOR CORPORATION, OF NEW YORK, N. Y., A CORPORATION OF DELAWARE

RESILIENT FILM GUIDE FOR MOTION PICTURE PROJECTION MACHINES

Application filed January 23, 1930. Serial No. 422,711.

This invention relates to motion picture machines, and more particularly to film guides therefor. The invention is especially applicable to a film guide for directing a film over the aperture plate of a motion picture projection machine.

An object of the present invention is to provide a resilient film guide which is capable of freely passing a film and at the same time assuring the correct alignment thereof.

Another object is to provide a mounting for the film guide by which the guide may be freely moved angularly and transversely in response to variations in film width.

Another object is to provide a film guide which is capable of accommodating films of slightly different widths.

A further object is to provide a self-adjusting film guide which automatically compensates for irregularities in the edge of a film and foreign materials that may be lodged thereon.

A still further object is to provide a guide bar which is movable in response to pressure on any portion thereof.

Another object is to provide a relatively simple, dependable, highly efficient and convenient device of the type above indicated.

The invention also consists in certain new and original features of construction and combinations of parts hereinafter set forth and claimed.

Although the novel features which are believed to be characteristic of this invention will be particularly pointed out in the claims appended hereto, the invention itself, as to its objects and advantages, the mode of its operation and the manner of its organization may be better understood by referring to the following description taken in connection with the accompanying drawings forming a part thereof, in which Fig. 1 is a front elevation of an aperture plate showing the film guides mounted thereon;

Fig. 2 is a section taken on the line 2—2 of Fig. 1 showing the mounting for the resilient guide;

Fig. 3 is a section taken on the line 3—3 of Fig. 2; and

Fig. 4 is an enlarged sectional view taken on the line 4—4 of Fig. 2.

Like reference characters denote like parts in the several figures of the drawing.

In the following description and in the claims parts will be identified by specific names for convenience, but they are intended to be as generic in their application to similar parts as the art will permit.

Referring to the drawing more in detail, one embodiment of the invention is shown as applied to an aperture plate 10 having an aperture 11 therein for the passage of the projection rays and having a supporting member 12 secured thereto by which the aperture plate may be mounted on a projection machine in a manner well known in the art.

The upper portion of plate 10 is provided with a pair of ears 14 in which roller 15 is journalled. Said roller is provided with a pair of supporting surfaces 16 which are adapted to contact with the projection film and direct the same over the aperture plate.

A fixed guide 20, provided with a lip 21, is secured to one side of aperture plate 10 as by screws 22 and is adapted to direct one edge of the film past aperture 11. Lip 21 is undercut as at 23 to permit accurate machining of the adjacent surfaces.

Guide 25, provided with a lip 26, is mounted on the aperture plate 10 in a position to direct the opposite edge of the film and is secured by screws 27. Said guide 25 is provided with a plurality of recesses 30 in which guide bars 31 are mounted. Said guide bars are provided with upstanding flanges 32 which are of substantially the same elevation as the surface of guide 25 when the bars are in operating position. Bars 31 are also undercut adjacent flanges 32 as at 33 to facilitate machining.

Each recess 30 is provided with a central, substantially arcuate extension 35 in which a flat leaf spring 36 is seated. Said leaf spring is provided with a central arcuate portion 37 of a contour similar to extension 35 of recess 30 and the ends 38 are adapted to bear against the opposite ends of guide bar 31 for holding said bar in engagement with the edge of the film.

The corners of recesses 30 are extended as at 40, 41 to provide clearance for the machining tool. Extensions 41 also provide clearance for the ends of spring 36 when said spring is compressed by movement of bar 31. Guide bar 31 is preferably formed substantially shorter than recess 30, so that free pivotal movement may be obtained.

It is to be noted that resiliently mounted bars 31 are freely movable in response to pressure upon any portion thereof. These bars may be moved both pivotally and transversely and are capable of accommodating themselves to the contour of the film edge. Standard films vary somewhat in width as from 1.340" to 1.375". This variation must be compensated for by the film guide if the film is to be correctly aligned over the aperture. The above described resiliently mounted guide bars are capable of accommodating themselves to these different widths and are also freely movable in response to pressure caused by any irregularity in the film. All danger of binding is eliminated by providing sufficient clearance for pivotal movement of the bar and by freely mounting the bar for movement in practically all directions.

The extensions at the corners of the recesses are essential as it is impractical to finish the pieces with square corners. Unless clearance is provided for the cutting tool the corners would remain slightly curved and would reduce the effective area of the recess. These recesses also prevent dirt and other materials from accumulating and clogging the device. The undercut flange 32 may be properly machined to allow maximum movement of the guide bar within guide 25.

In normal operation the downward motion of the film will cause the bars to seat at the lower end of the recesses. In that case sufficient clearance is provided at the top to allow the necessary movement of the bar without bending.

A pair of resiliently mounted bars has been disclosed as mounted in guide 25. These bars are mounted in position to direct a film as it approaches the aperture and as it passes the same. It is obvious, however, that the number and distribution of guide bars could be varied as required and that the invention is applicable to any device which utilizes a travelling film.

While certain novel features of the invention have been shown and described and are pointed out in the annexed claims, it will be understood that various omissions, substitutions and changes in the forms and details of the device illustrated and in its operation may be made by those skilled in the art without departing from the spirit of the invention.

What is claimed is:

1. In combination with an aperture plate, a pair of guide members mounted thereon, said guide members having lips over which a film may be passed, one of said guide members having mounted thereon a plurality of guide bars, and resilient means for holding said guide bars in contact with the edge of the film, comprising leaf springs seated in said guides and bearing against said guide bars.

2. In combination with an aperture plate a longitudinal guide mounted thereon, said guide having a recess therein, a guide bar in said recess, and means for mounting said guide bar for both pivotal and transverse movement comprising a leaf spring seated in said recess and bearing against said bar.

3. In combination with an aperture plate a longitudinal guide mounted thereon, said guide having a recess therein, a guide bar in said recess, and means for mounting said guide bar for both pivotal and transverse movement comprising a leaf spring seated in said recess, the center portion thereof engaging said guide and the ends thereof engaging said guide bar.

4. In combination with an aperture plate a longitudinal guide mounted thereon, said guide having a recess therein, a guide bar in said recess, and means for mounting said guide bar for both pivotal and transverse movement comprising a leaf spring seated in said recess, the center portion thereof engaging said guide and the ends thereof engaging said guide bar, said recess having an extension in which said center portion is seated.

5. In combination with an aperture plate a longitudinal guide mounted thereon, said guide having a recess therein, a guide bar in said recess, and means for mounting said guide bar for both pivotal and transverse movement comprising a leaf spring seated in said recess and bearing against said bar, the corners of said recess being extended to provide clearance for a cutting tool.

6. In combination with an aperture plate, a longitudinal film guide mounted thereon, said guide having a recess therein, a guide bar in said recess, and means for mounting said guide bar for both pivotal and transverse movement, said guide bar having a flange extending normal to said film and adapted to bear against the edge of said film.

7. In combination with an aperture plate, a longitudinal guide mounted thereon, said guide having a recess therein, a guide bar in said recess, and means for mounting said guide bar for both pivotal and transverse movement, said guide bar having a flange extending normal to said film and adapted to bear against the edge thereof, said guide bar being undercut adjacent said flange to provide clearance for a tool.

8. A film guide comprising a longitudinal member having a lip adapted to receive a film, a plurality of recesses therein, guide bars mounted in said recesses, a leaf spring carried in each of said recesses and bearing against said guide bars for resiliently securing the same in engagement with the film, said guide bars having flanges extending normal to said film and adapted to contact with the edge of the film, said flange being undercut to permit accurate machining.

9. A film guide comprising a longitudinal member having a lip adapted to receive a film, a plurality of recesses in said member, guide bars mounted in said recesses, a leaf spring carried in each of said recesses and bearing against said guide bars for resiliently securing the same in engagement with the film, said guide bars having flanges extending normal to said film and adapted to contact with the edge of the film, said flange being undercut to permit accurate machining, the corners of said recesses being extended to provide clearance for the machining tool.

10. A film guide comprising a longitudinal member having a lip adapted to receive a film, a plurality of recesses in said member, guide bars mounted in said recesses, a leaf spring carried in each of said recesses and bearing against said guide bars for resiliently securing the same in engagement with the film, said guide bars having flanges extending normal to said film and adapted to contact with the edge of the film, said flange being undercut to permit accurate machining, the corners of said recesses being extended to provide clearance for the machining tool, said recesses having a central extension in which said leaf spring is seated.

11. In a projection machine, an aperture plate a pair of film guides thereon having longitudinal lips adapted to support a film, and guiding surfaces adapted to contact with the film edges, one of said guides having a plurality of recesses therein, guide bars mounted in said recesses, a leaf spring carried in each of said recesses and bearing against said guide bars for resiliently securing the same in engagement with the film, the lip of the guide forming a stop for said guide bars to limit their movement in one direction.

12. A film guide comprising a longitudinally extending member having a transverse lip with a film supporting surface parallel to a film face, a guide bar mounted on said member and having a surface normal to said film supporting surface adapted to contact with the transverse edge of the film and means for mounting said guide bar for pivotal and transverse movement in the plane of said film face and resilient means acting in said plane for holding said guide bar against said transverse edge.

13. A film guide comprising a longitudinally extending member having a surface parallel to a film face, a guide bar mounted on said member and having a surface normal to said film supporting surface adapted to contact with the transverse edge of the film and means for mounting said guide bar for pivotal and transverse movement in the plane of said film face and resilient means acting in said plane for holding said guide bar against said transverse edge.

AUGUSTO DINA.